US012286830B1

(12) United States Patent
Barker

(10) Patent No.: US 12,286,830 B1
(45) Date of Patent: Apr. 29, 2025

(54) POCKET DOOR GUIDE

(71) Applicant: Daniel Barker, Pickerington, OH (US)

(72) Inventor: Daniel Barker, Pickerington, OH (US)

( * ) Notice: Subject to any disclaimer, the term of this patent is extended or adjusted under 35 U.S.C. 154(b) by 0 days.

(21) Appl. No.: 18/121,876

(22) Filed: Mar. 15, 2023

(51) Int. Cl.
*E05F 5/00* (2017.01)
*E05F 7/00* (2006.01)

(52) U.S. Cl.
CPC .............. *E05F 5/003* (2013.01); *E05F 7/005* (2013.01); *E05Y 2900/14* (2013.01)

(58) Field of Classification Search
CPC . E06B 3/4654; E05Y 2900/14; A47B 88/487; E05F 5/003; E05F 7/005
See application file for complete search history.

(56) References Cited

U.S. PATENT DOCUMENTS 728,277 A * 5/1903 McCabe ................. E05F 11/00 49/420
755,490 A * 3/1904 Hiatt ......................... E06B 3/44 49/420
930,072 A * 8/1909 Halladay ................. E05F 11/00 49/420
1,679,244 A * 7/1928 Fitzgerald .............. B60J 1/2097 49/377
1,925,165 A * 9/1933 Zimmerman ......... E05F 17/001 49/16
2,202,209 A * 5/1940 Kennedy .............. A47B 88/437 312/334.15
3,269,060 A * 8/1966 Kessner .................... E06B 3/50 49/264
3,300,897 A * 1/1967 Wikkerink ............ E06B 3/5072 49/141
3,400,490 A * 9/1968 Anderson ............... E05D 15/06 49/504
3,619,947 A * 11/1971 Burum ................ E05D 15/0669 16/99
3,688,340 A * 9/1972 Schoenbrod .......... E05D 15/066 49/420

(Continued)

FOREIGN PATENT DOCUMENTS

CN 110080641 B * 2/2021 ......... E05D 15/0626
KR 200438445 Y1 * 3/2007

OTHER PUBLICATIONS

English translation for KR-200438445-Y1.*

*Primary Examiner* — Justin B Rephann
(74) *Attorney, Agent, or Firm* — Frank H. Foster; Kremblas & Foster

(57) ABSTRACT

A pocket door guide having a first arm for extending into a pocket slot and seating against an inner side of a wall component that defines a side of the pocket slot and a second arm connected to and extending transversely from the first arm for seating against an end of the wall component. The arms are connected together to form an apex. A roller assembly having a roller is mounted to the second arm and protrudes, or is adjustable to protrude, beyond the apex. The roller assembly includes a roller base having axle supports mounted to the roller base and an axle extending through the axle supports and roller. The roller assembly can slide along the second arm and has fasteners engaging the roller base for fixing the roller assembly at a selected position. The second arm joins the roller base with a dovetail ridge and mating dovetail slot.

16 Claims, 7 Drawing Sheets

(56) References Cited

U.S. PATENT DOCUMENTS

| | | | | | |
|---|---|---|---|---|---|
| 4,095,853 | A * | 6/1978 | MacDonald | A47B 88/487 | |
| | | | | 384/19 | |
| 5,148,630 | A * | 9/1992 | Llorens | E05D 15/066 | |
| | | | | 49/425 | |
| 6,058,655 | A * | 5/2000 | Gravel | B60P 7/14 | |
| | | | | 49/306 | |
| 10,689,893 | B2 * | 6/2020 | Selvaag | E05D 15/0626 | |
| 10,988,971 | B1 * | 4/2021 | Annazone, Jr. | E05D 15/0621 | |
| 11,519,219 | B2 * | 12/2022 | Everett | E06B 3/4654 | |
| 2015/0219344 | A1 * | 8/2015 | Glover | E06B 3/6612 | |
| | | | | 165/59 | |

* cited by examiner

POCKET DOOR GUIDE

BACKGROUND OF THE INVENTION

This invention relates generally to hardware for building interiors, particularly doors, and more specifically relates to a guide for quietly directing and holding pocket doors aligned with their pocket (referred to herein as a pocket slot). Pocket doors save space so they often are an attractive alternative to hinged doors in building interiors. A pocket door is suspended from wheeled hangers that ride along a track so that the door can be pushed and slid horizontally into a wall. Typically, the pocket door is concealed within a pocket slot that is formed in the wall to receive the door. When the door is stored within its pocket slot, only an end stile of the door is visible at the open end of the pocket slot.

Although a pocket door can freely slide in and out of its pocket slot without any guidance hardware at its bottom, it is usually desirable to install pocket door guides at the bottom of the door at the opening to the pocket slot. Pocket door guides are typically attached to the door jambs on opposite sides of the pocket door slot or attached to the floor. The guides protrude into an extension of the pocket door slot on opposite sides of the pocket door. A pocket slot is a clearance space between the wall components that define the opposite sides of the pocket slot. In the absence of a pocket door guide, the clearance space allows the door to swing sideward while suspended from its track. Pocket door guides on opposite sides of the bottom of the door confine the angle of door swing and prevent the door from rubbing against the wall components on opposite sides of the door and damaging the door finish. This also prevents a swinging pocket door from causing annoying rattle or bumping sounds.

During installation of pocket door guides, it is necessary to adjust their horizontal position with respect to the opposite major side or face surfaces of the door. Most commonly, pocket door guides are provided with circular mounting holes which require the carpenter who installs them to accurately position them, drill holes for the screws and then screw them into position. With such guides, if they are installed and then tested by sliding the door between the guides, and if the positioning is found to be unsatisfactory, readjustment requires that new holes be drilled to install the guides at a different position. If the mounting holes are elongated, the mounting screws need to be loosened, the guide moved and the screws retightened. Adjustment with elongated mounting holes is limited to the length of the hole. Such elongated holes also permit the guides to be unintentionally pushed out of position if a sufficient transverse force is applied against the door.

Most pocket door guides are formed of a one-piece, low friction material. Consequently, although the material is low friction, it still rubs along the bottom of the door when the door is slid open or closed. Therefore the rubbing against the bottom of the door often wears a visible horizontal line into the door's finish.

Pocket door guides that are currently available appear to lack positioning surfaces that position the guide both at the proper location with respect to a side of the pocket slot and at the proper location with respect to the door's side jambs. The prior art does show pocket door guides with an upstanding flange or panel that seats against only a side of the pocket slot but have no corresponding surface for also positioning the guide with respect to the door's side jambs.

Many pocket door guides have upstanding legs that are joined together by a connecting web and straddle the door. These guides must be mounted within the pocket slot so that the door will always be within the upstanding legs when the door is pushed all the way into the pocket slot. Otherwise, when the door is opened, it would butt against the guide. However, it is difficult to install or replace such a guide because the opening of the pocket slot at the door jambs is so narrow that it is very difficult for a carpenter to insert a hand into the pocket slot far enough to tighten screws that attach the door guide.

Therefore, it is an object and feature of the invention is to overcome the deficiencies of existing pocket door guides that are described above.

Another object and feature of the invention is to provide a pocket door guide which is easy to install in a new installation or retrofit to an existing installation, easy to adjust and, if needed, to readjust after testing of the door.

Another object and feature of the invention is to provide a pocket door guide that has a small footprint and fastens to the wall so it protrudes minimally into a room and does not present a tripping hazard.

Yet another object and feature of the invention is to provide a pocket door guide that does not extend under the door and therefore does not require that the bottom edge of the door be spaced from the floor by the additional distance of the thickness of the part of the door guide that is under the door.

Yet another object and feature of the invention is to provide a pocket door guide that maintains smooth and quiet contact with the pocket door as the door slides between a pair of pocket door guides on opposite sides of the door despite the door having segments that vary in contour and/or thickness.

SUMMARY OF THE INVENTION

The invention is a pocket door guide for guiding a pocket door in and out of a pocket slot formed within a wall. The pocket door guide has a first arm for extending into a pocket slot and seating against an inner side of a wall component that defines a side of the pocket slot. A second arm is connected to and extends transversely from the first arm for seating against an end of the wall component at the end of the pocket slot. The arms are connected together at an end of each arm to form an apex so the second arm can extend from the apex transversely to the pocket slot. Together the arms facilitate accurate positioning of the pocket door guide at a corner edge of a pocket slot and restrain the guide from being pushed out of position. A roller assembly has a roller and is mounted to the second arm so it protrudes, or is adjustable to protrude, beyond the apex. The roller assembly includes a roller base having axle supports mounted to the roller base at opposite ends of the roller and an axle extending from the axle supports into the roller at the central axis of the roller. The roller assembly is adjustably slidable along the second arm and has a position retainer, for example fasteners engaging the roller base, for fixing the roller assembly at a selected position along the second arm. The first arm is tapered in thickness from a thicker part at the apex to the thinnest part at its opposite distal end to form a wedge configuration. The wedge surface guides the door toward the center of the pocket slot until the door contacts the roller. The second arm and the roller base are formed with a dovetail ridge on one and a mating dovetail slot on the other so the roller assembly can slide adjustably along the second arm without separating from the second arm. If the position retainer comprises fasteners, the fasteners are mounted to the roller base and are engageable with the second arm to prevent sliding of the roller base with respect to the second arm, thereby securing the roller base at a selected adjustment position along the second arm. The fasteners can be threadedly engaged to the roller base as set screws and are engageable against the second arm by being rotated so their ends move against the surface of the second arm.

The invention also includes a spring biased embodiment of the invention that applies a biasing force on the roller to maintain the roller against a side of the door if the contour or thickness of the door varies or the door swings as it is opened or closed.

The invention also includes a position retainer in the form of a compliant latch structure that retains the roller assembly in a selected position on the second arm.

Figure 1:
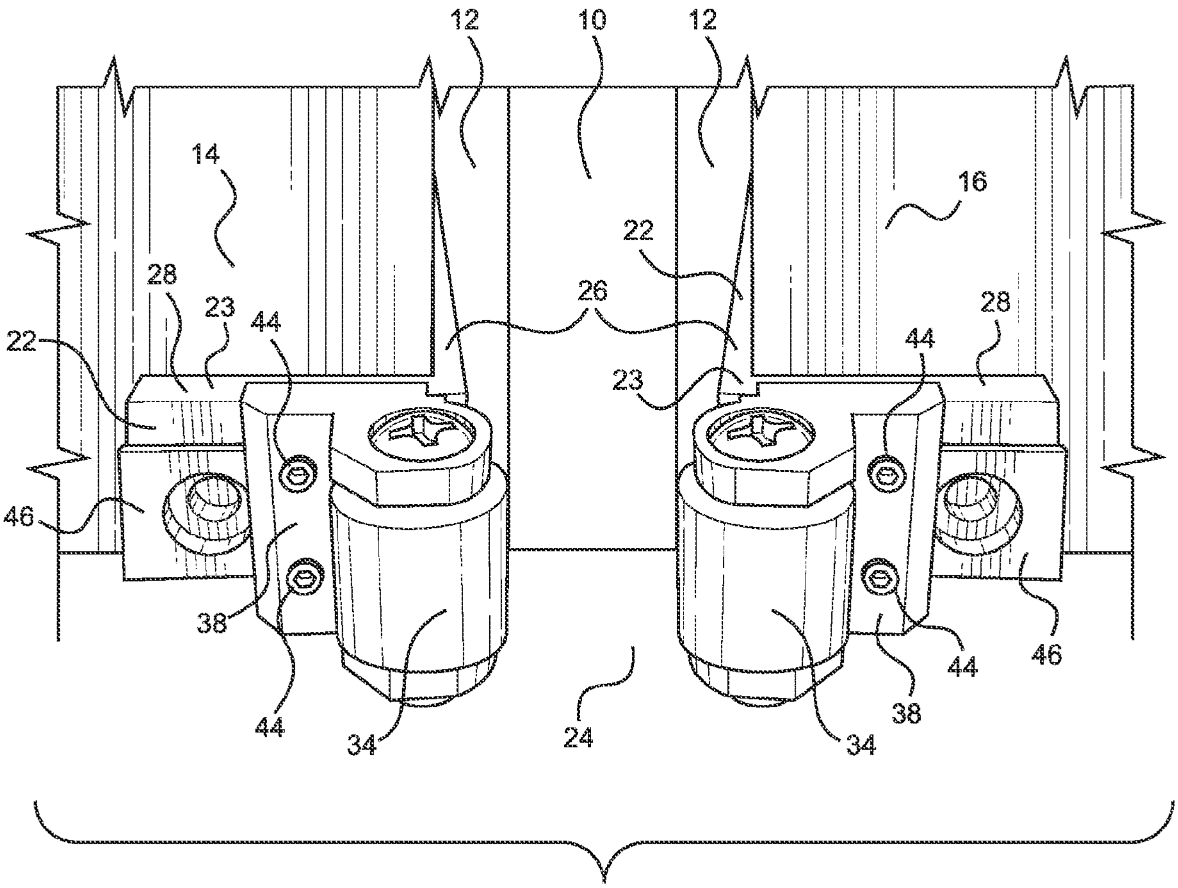
FIG. 1 is a view in perspective of the preferred embodiment of the invention installed in an operable position.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Because the invention is a guide for a pocket door, this description begins with a description of the long known pocket door and associated terminology which is used in this description. A wall is a panel that is a barrier between a room of a building and another room or the exterior of the building. A wall has two side components, one side component facing and visible from within a room and the other side component facing and visible from another room or from the exterior of a building. Commonly the two side components are attached together and formed as a unitary wall structure. For example, one type of wall is typically formed by vertical 2×4 studs extending between a bottom plate, which is nailed to the floor, and a top plate and have a vertical wall board attached to each of its opposite sides.

A pocket door is a desirable type of door which is suspended from wheeled carriages or hangers that roll along a track. A pocket door slides into a hollow space within a wall where the door is concealed except for an end stile. If a pocket door is movable into a wall, the two side components of the wall cannot be joined together as a unitary structure because there needs to be clearance space within the wall for receipt of the pocket door. That clearance space is referred to in this description as a pocket slot. A pocket slot is a three dimensional space between two wall components of a building. A pocket slot is sometimes generally referred to as an opening or a recess. The pocket slot is sized for receiving a sliding door between the two wall components. Commonly, the two wall components each are constructed of "split studs". Each of the two wall components have one side facing the pocket slot and an opposite side facing a different room or the building exterior. The ends of the two wall components often have trim or paneling at their ends adjacent the pocket slot. Those ends, whether an exposed frame or have trim mounted on the frame, can be referred to as side jambs The preferred embodiment of the invention is illustrated in its installed position in FIGS. 1 and 2. FIG. 3 shows the assembled pocket door guide components and FIGS. 4 through 9 show details of those components.

Figure 2:
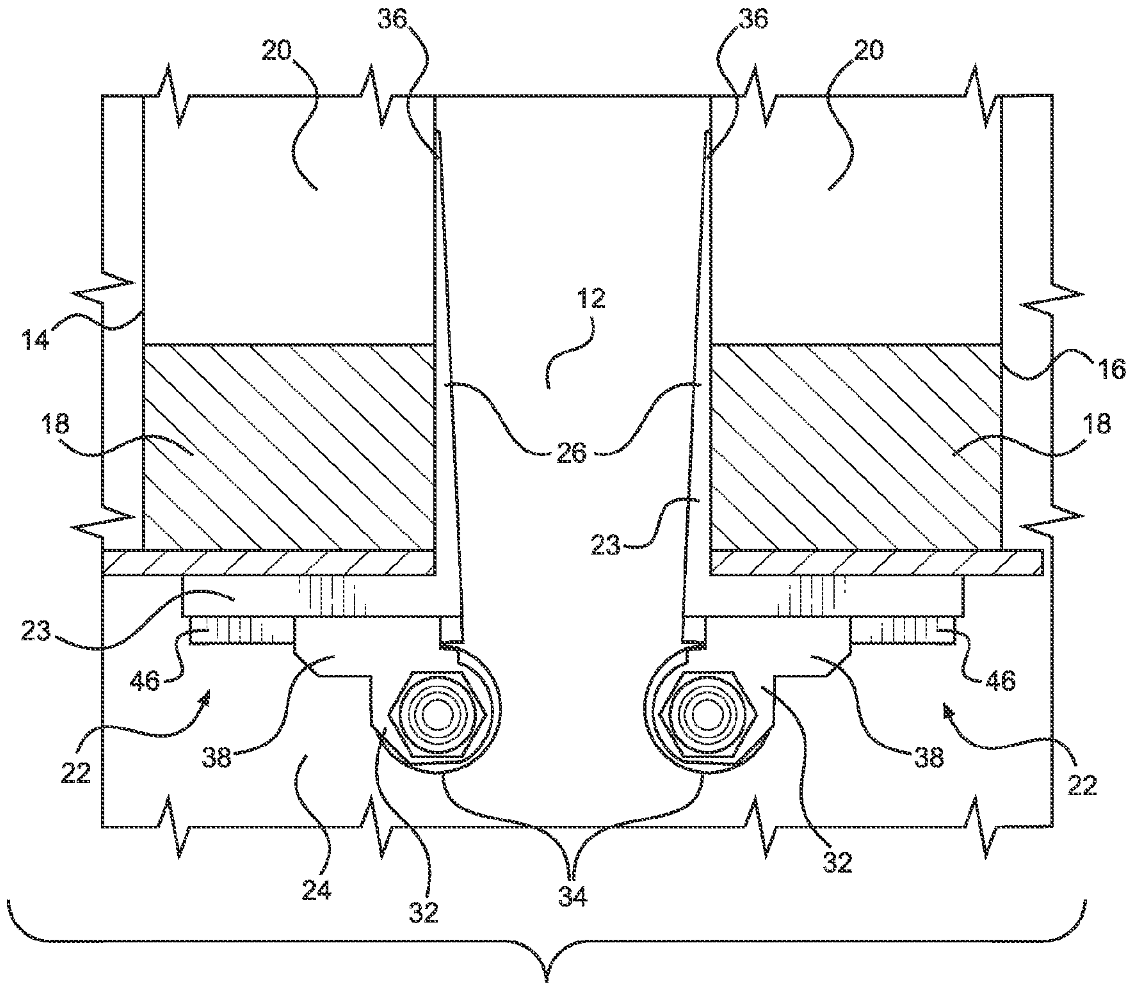
FIG. 2 is a top view of the installed embodiment of FIG. 1.
Figure 3:
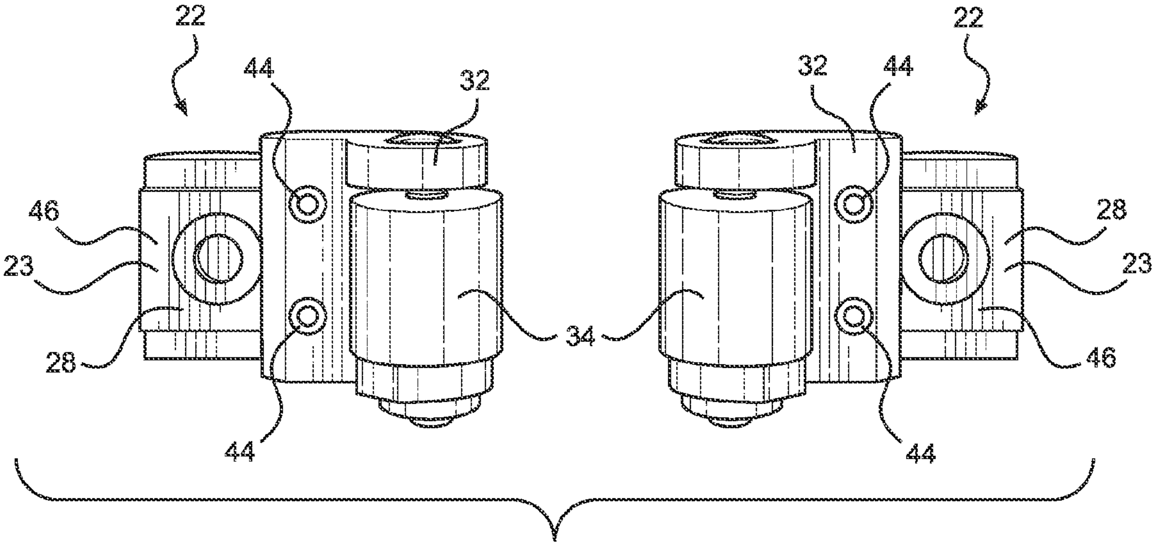
FIG. 3 is a side view of the preferred embodiment of the invention in an installed orientation.

Referring principally to FIGS. 1 and 2, a pocket door 10 is mounted in a pocket slot 12 in a conventional manner. The pocket slot 12 is formed between and defined by the inner sides of two wall components 14 and 16. The illustrated wall components 14 and 16 have vertical studs 18 (FIG. 2) butting against bottom plates 20. A pair of pocket door guides 22 are mounted against the wall components 14 and 16 on opposite sides of the door 10. Preferably, but optionally, the guides 22 are spaced a small distance above the floor 24.

The pocket door guide 22 is comprised of two principal components. The two components are a seating base 23 and a roller assembly 32. The seating base of each pocket door guide 22 has a first arm 26 extending into the pocket slot 12 and seating against an inner side of one of the wall components 14 and 16 that define an inner side of the pocket slot 12. Each seating base 23 also has a second arm 28 connected to and extending transversely from the first arm 26. The second arm 28 seats against an end of a wall component 14 or 16 at the end of the pocket slot 12. The arms 26 and 28 are connected together at an end of each arm to form an apex 30 so the second arm 28 can extend from the apex 30 transversely to the pocket slot 12. The arms 26 and 28 preferably extend linearly and are perpendicular (orthogonal) to each other. Consequently, the arms 26 and 28 facilitate installation of the guides 22 by allowing the installer to position the guides 10 by simply seating the orthogonal arms 26 and 28 of each guide 22 against a different one of the two pairs of orthogonal wall component surfaces that form corners at the end of the pocket slot 12.

The roller assembly 32 is mounted to the second arm 28 of the seating base 23 and includes a roller 34 that is rotatably mounted as part of the roller assembly 32 for rotation about an axis that is vertical in the operable orientation of the door guide 22. The roller assembly 32 protrudes, or is adjustable to protrude, beyond the apex 30. The purpose of the roller assembly 32 is to permit a pair of pocket door guides 22 to be installed with one roller 34 in contact with one side of the door and another roller 34 in contact with the opposite side of the door 10.

Figure 4:
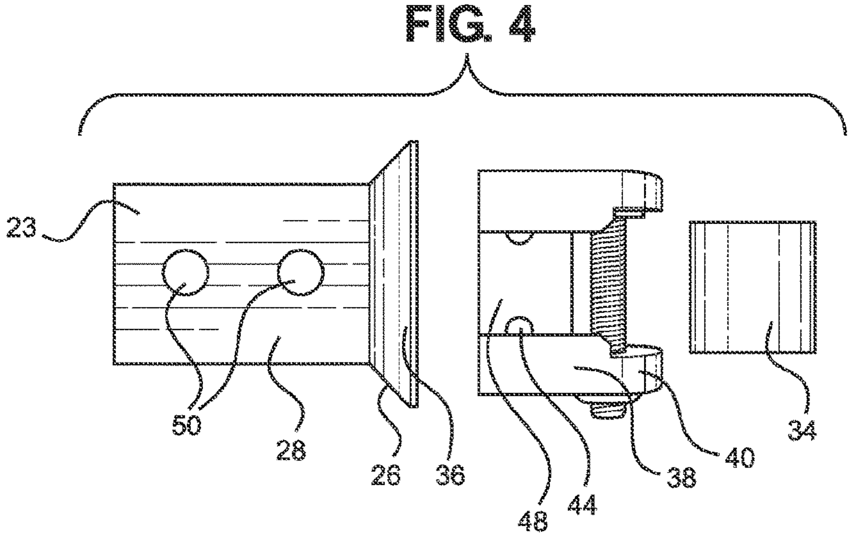
FIG. 4 is an exploded view in rear elevation of the preferred embodiment of the invention.
Figure 5:
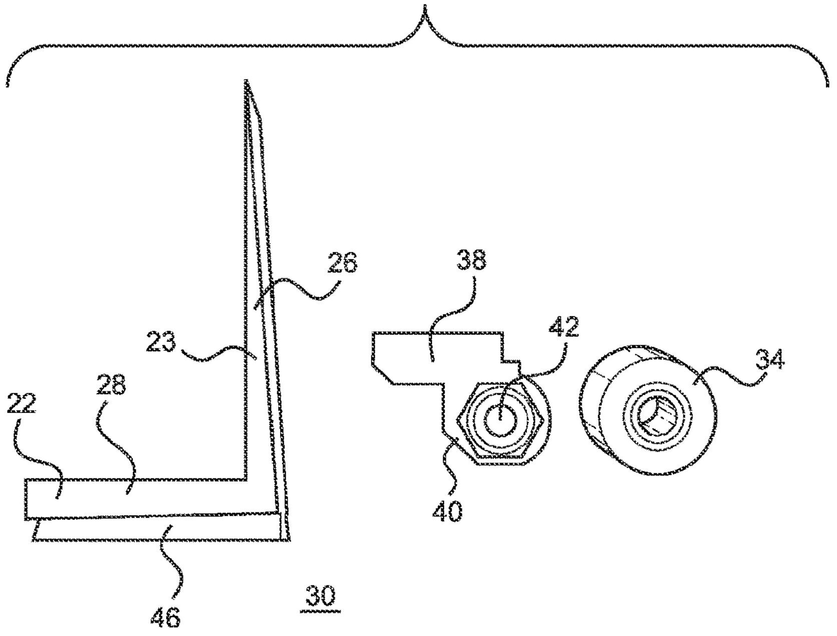
FIG. 5 is an exploded top view of the preferred embodiment illustrated in FIG. 4.
Figure 6:
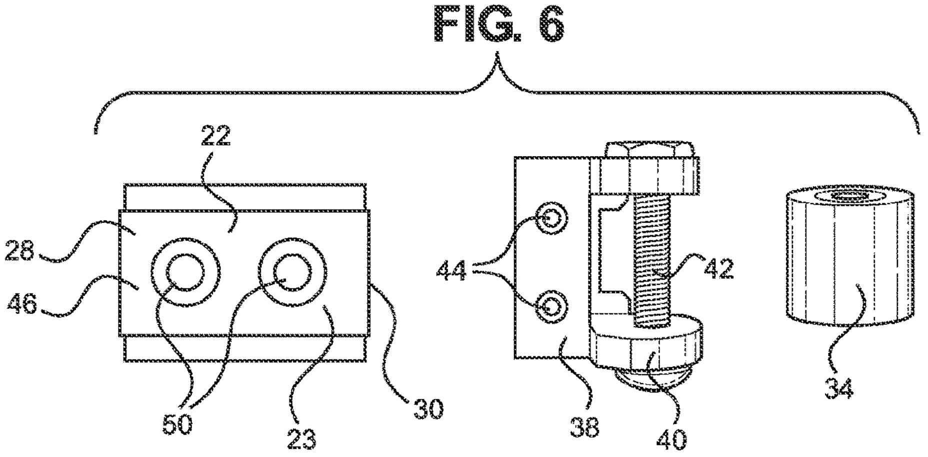
FIG. 6 is an exploded view in front elevation of the preferred embodiment illustrated in FIG. 4.
Figure 7:
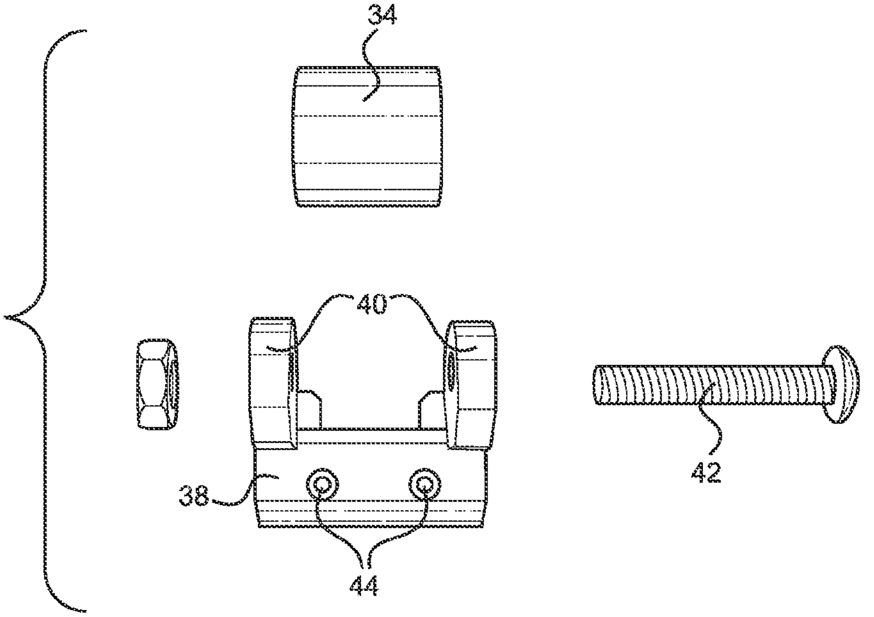
FIG. 7 is an exploded view of the roller assembly component of the preferred embodiment illustrated in FIG. 4.
Figure 8:
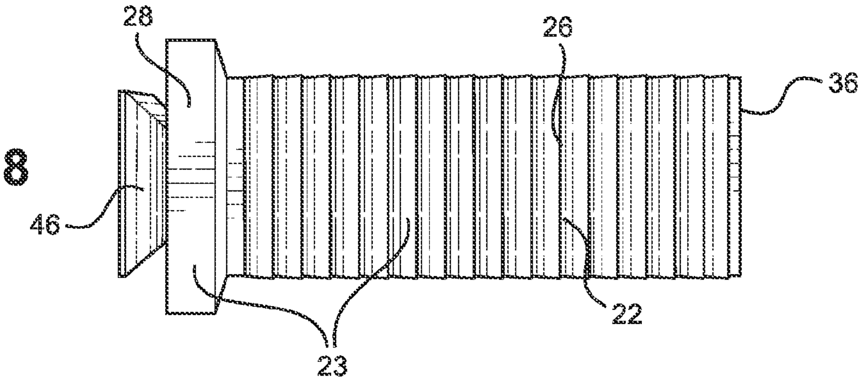
FIG. 8 is a view in vertical elevation of the first and the second arm of the preferred embodiment of the invention.
Figure 9:
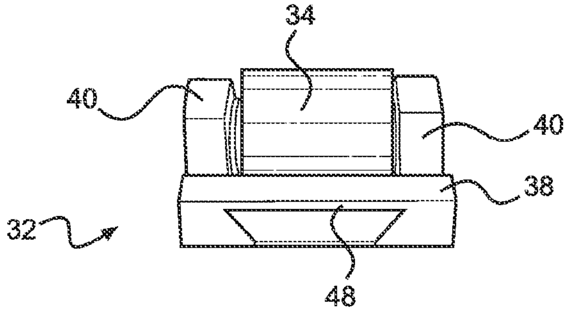
FIG. 9 is an end view of the roller assembly of the preferred embodiment of the invention.

Referring particularly to FIGS. 4-6, the roller assembly 32 includes a roller base 38 having axle supports 40 mounted to the roller base 38 at opposite ends of the roller 34. An axle 42, such as a threaded bolt, extends through the axle supports 40 and the roller 34 along the central axis of the roller 34. The roller assembly 32 is adjustably slidable along the second arm 28 and has a position retainer in the form of fasteners 44 engaging the roller base 38 for fixing the roller assembly at a selected position along the second arm 28. The fasteners 44 allow the installer to slide the roller base 38, and therefore the roller 34, to a selected distance toward or away from an open door and then rigidly fix the roller base 38 to the second arm 28 at the selected position. In this way the installer is able to align the outer surfaces of the two opposite rollers so that the distance between the rollers is substantially equal to the thickness of the door 10.

Preferably, the first arm 26 is tapered in thickness from a thicker part at the apex 30 to the thinnest part at its opposite distal end 36 to form a wedge configuration. The wedge shape guides a closing door away from the interior surface of the wall components 14 and 16 toward the center of the pocket slot until the door contacts the rollers 34. Desirably, the rollers 34 are positioned so that the door 10 will contact the rollers 34 along their inner cylindrical surfaces so that the rollers 34 will smoothly and quietly guide the doors between the rollers 34.

In the preferred embodiments, the second arm 28 and the roller base 38 are formed with a dovetail ridge 46 on one and a mating dovetail slot 48 on the other. That allows the roller assembly to slide adjustably along the second arm 28 while preventing the roller assembly from being separated from the second arm 28 in a direction transverse to the axis of the ridge 46 and slot 48. Fasteners 44 extend through the roller base 38 so that, by rotation of the fasteners, the fasteners prevent sliding of the roller base 38 with respect to the second arm 28. That secures the roller base 38 at a selected adjustment position. Preferably, the fasteners 44 are threadedly engaged to the roller base 38 as set screws and are engageable against the second arm 28 by being rotated Traditionally a dovetail ridge and slot have a trapezoidal cross section and a width at the bottom of the slot and the top of the ridge that are wider than the width at the top of the slot and the width at the bottom of the ridge. That allows the ridge to be slid into the slot and slid longitudinally along the slot but prevents the ridge from being withdrawn from the slot other than by sliding the ridge longitudinally along and then out of the slot. However the same principles of allowing sliding but not withdrawal can be obtained with mating slots and ridges having many different geometrical configurations. For example a ridge having a cross section that is more than half a circle can utilize the same principles when slid into and along a mating groove that has a cross section which is correspondingly more than half a circle. The same is true for T-shaped ridges and grooves as another example. Therefore, the terms dovetail ridge and dovetail slot are used to describe and include the variety of mating ridges and grooves that operate under the same principles even though they have a different geometrical configuration. They permit relative sliding but not substantial movement of the ridge in a transverse direction away from its mating slot.

In order to attach the seating base 23 of the pocket door guides 22 to each of the two opposite wall components 14 and 16, the second arm 28 has holes 50 for receiving screws that extend through the second arms and into the end of a wall component. The holes 50 are countersunk so the heads of screws used to attach the seating base to the wall components 14 and 16 can be recessed sufficiently to allow the roller base 38 to slide freely over the top of the screws and not interfere with adjustment of the roller assembly 32.

Figure 10:
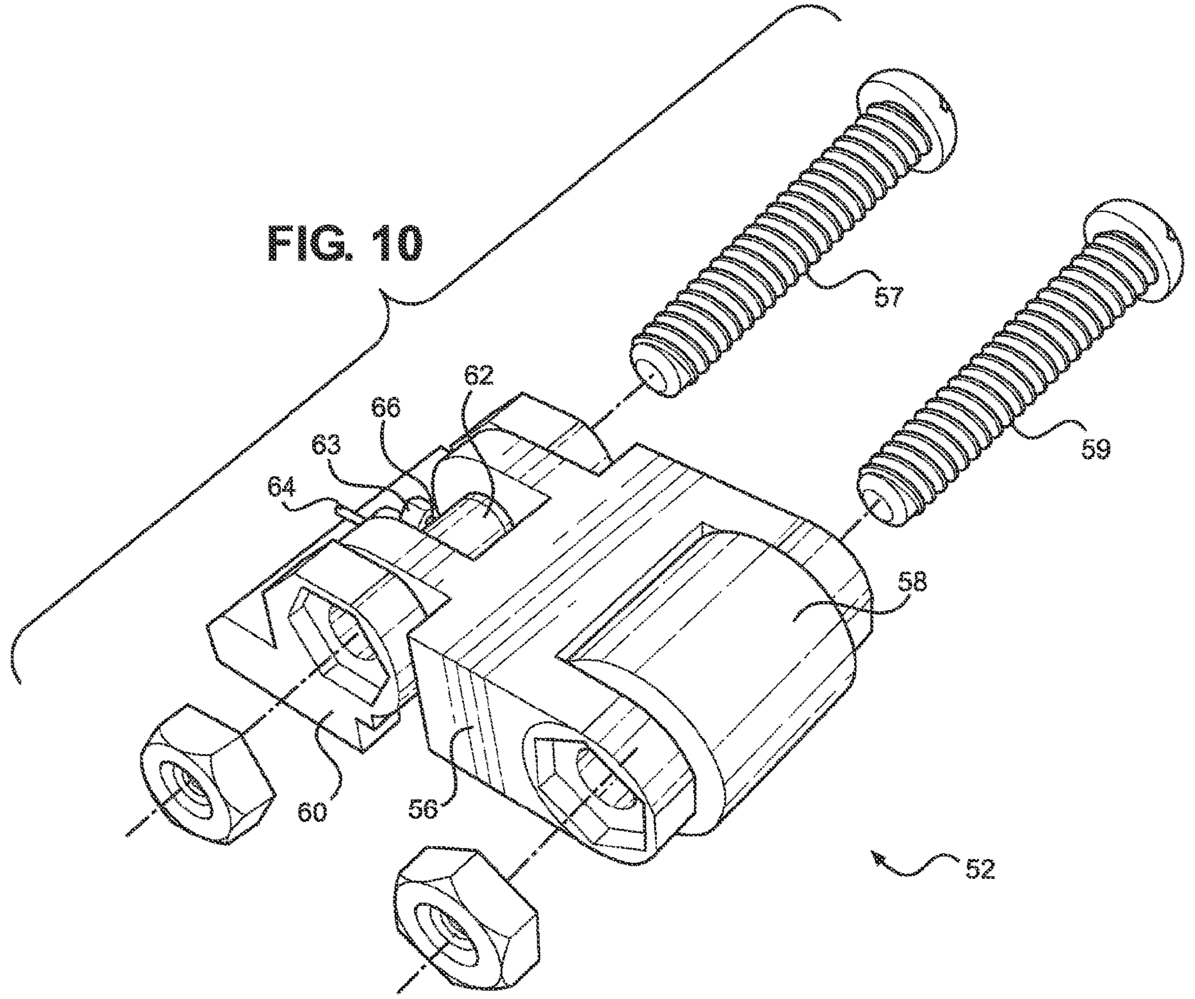
FIG. 10 is an exploded view in perspective of an alternative embodiment of the roller assembly of the invention.
Figure 11:
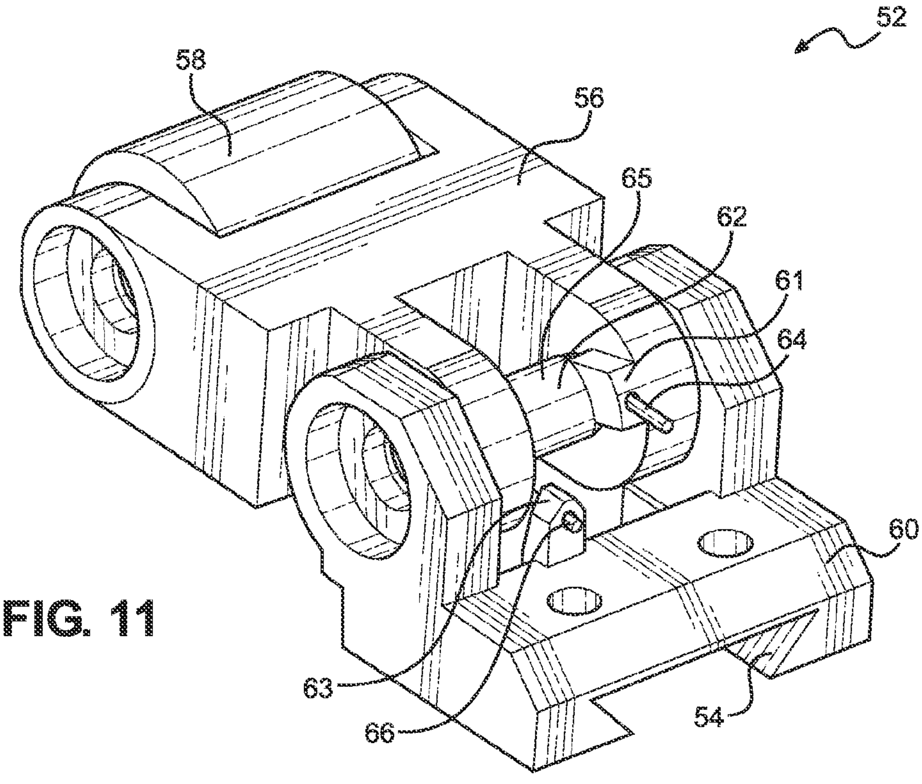
FIG. 11 is a view in perspective of the embodiment of the invention that is illustrated in FIG. 10.
Figure 12:
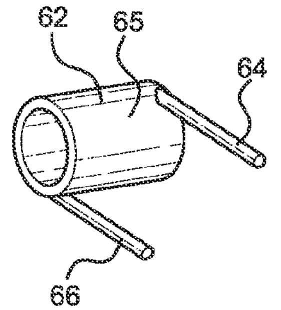
FIG. 12 is a view in perspective of the torque spring which forms a part of the alternative embodiment illustrated in FIGS. 10 and 11.

FIGS. 10-12 illustrate a roller assembly 52 that is an alternative to the previously described roller assembly 32. The alternative roller assembly 52 is preferably mounted to the same seating base 23 that was previously described. For that purpose, the roller assembly 52 is formed with a dovetail slot 54 (FIG. 11) that mates with the dovetail ridge 46 of the previously described roller base 38. Of course previously described alternative "dovetail ridges" are also applicable to the roller assembly 52. However, the alternative roller assembly 52 could instead be mounted to a seating base that has only a single arm, such as a plate, that seats against only one surface of a wall component.

The purpose of the roller assembly 52 is to provide a pocket door guide with resiliently biased rollers that can follow variations in the contour of the bottom of a pocket door, especially variations in the door thickness that the door guides encounter as the door is opened or closed. The roller assembly 52 has a roller arm 56 that has a roller 58 rotatably mounted at one end of the roller arm 56 with an axle 57 formed by a bolt. The opposite end of the roller arm 56 is pivotally mounted to a roller base 60 with an axle formed by a bolt. The roller arm 56 is biased by a torsion spring 62 for pivoting the roller arm 56 in a direction for increasing protrusion of the roller beyond the apex 30 of the seating base 23 (not shown in FIG. 10-11) which was previously described. That direction of spring force bias is a direction increasing and decreasing the protrusion of the roller into an extension of the pocket slot (i.e. the path of the pocket door).

Preferably the spring is a torsion spring 62 as illustrated in FIG. 12. The torsion spring 62 has torsion spring legs 64 and 66. The spring leg 64 is connected to the roller arm 56 by extending through a boss 61 that is fixed to the roller arm 56. The spring leg 66 is connected to the roller base 60 by extending through an ear 63 that is fixed to the roller base 60. The preferred torsion spring 62 is a torsion bar type of torsion spring that is constructed of a resilient tube 65 with the legs 64 and 66 embedded in the tube at its opposite ends. However, the torsion spring could alternatively be a helical coil type of torsion spring.

Figure 13:
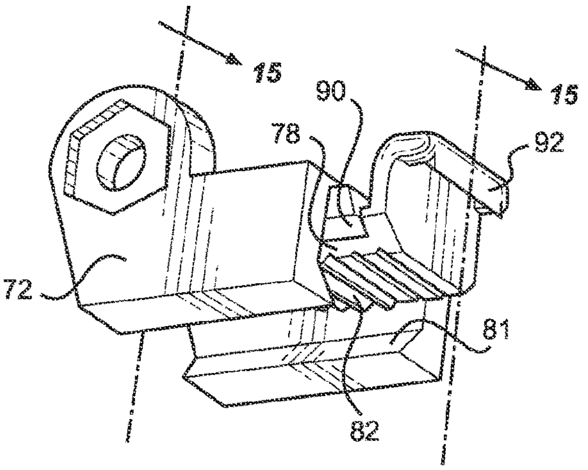
FIG. 13 is a view in perspective of a roller assembly of an alternative embodiment of the invention, without its roller and axle.
Figure 14:
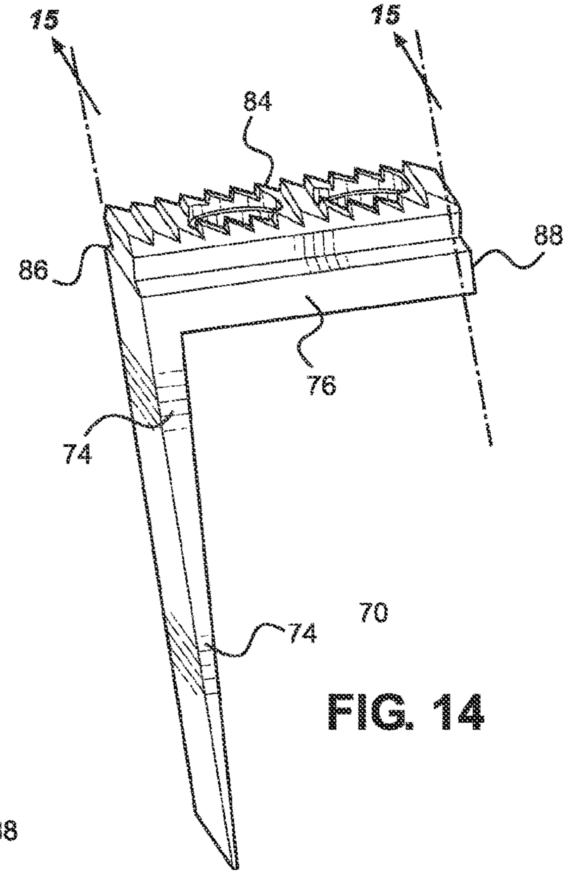
FIG. 14 is a view in perspective of a seating base for the embodiment illustrated in FIG. 13.
Figure 15:
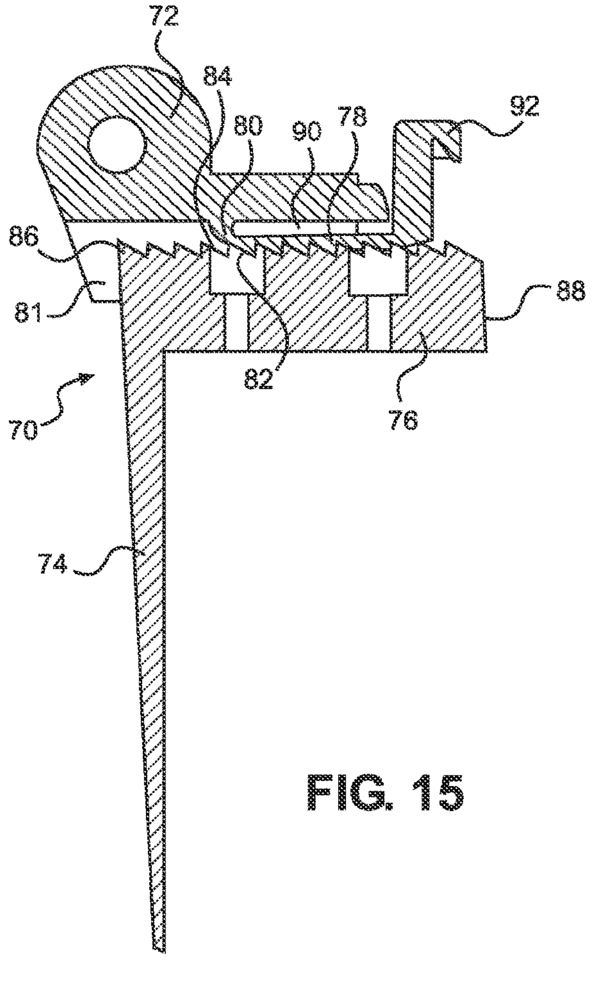
FIG. 15 is a view in section taken substantially along a plane 15-15 through the assembled alternative embodiment of FIGS. 13-15.

FIGS. 13 through 15 show an embodiment of the invention that has a compliant latch for retaining the roller assembly in a selected position on the second arm of the seating base. The roller and its axle are omitted from these views of the invention. This embodiment has a seating base 70 and a roller assembly 72 that are like those in the other embodiments except for its position retainer. The position retainer of this embodiment is a compliant latch that is subsequently described and replaces the fasteners that are described above and used for the same purpose. Although fasteners could be used in combination with the compliant latch, they are believed to be superfluous for most applications.

The seating base 70 has a first arm 74 and a second arm 76. The position retainer includes a latch lever 78. The latch lever 78 is attached at one end to the roller assembly 72 by a resilient hinge 80. The preferred resilient hinge 80 is a living hinge (aka an integral hinge). A living hinge is a thin flexible hinge (flexure bearing) made from the same material as the two rigid pieces it connects. Plastic living hinges are usually formed by simultaneously molding or 3-D printing all three parts, the hinge and the two parts that the hinge connects together, as a single piece or unitary body. In the preferred embodiment, the latch lever 78, the hinge 80 and the roller assembly 72 are integrally formed as a unitary body, except for the roller and its axle. Although not preferred, the hinge could alternatively be a separate more conventional hinge that connects the latch lever to the roller assembly.

The latch lever 78 has a serrated surface 82 facing the second arm 76 when the second arm 76 is inserted into the dovetail slot 81 of the roller assembly 72. The second arm 76 has a serrated surface 84 that faces, is engageable with, and mates with the serrated surface 82 of the latch lever 78 when the second arm 76 is inserted into the dovetail slot 81 of the roller assembly 72. The serrated surfaces 82 and 84 have opposing serrations that are configured and oriented to prevent translation of the roller assembly 72 along the second arm 76 in a direction away from the apex 86 and toward an opposite end 88 of the second arm 76 when the serrated surfaces 82 and 84 are engaged.

The resilient hinge 80 is configured to apply a pivoting force on the latch lever 78 that urges the latch lever 78 toward the second arm 76 into engagement against the serrated surface 84 of the second arm 76. The latch lever 78 is sufficiently spaced from the roller assembly by a gap 90 to permit the latch lever 78 to be lifted away from the second arm 76 far enough to disengage the serrated surface 82 of the latch lever 78 from the serrated surface 84 of the second arm 76.

A finger tab 92 protrudes from the free end 88 of the latch lever 78 beyond an end of the roller assembly 72. The finger tab 92 facilitates lifting of the latch lever 78 away from the second arm 76 in order to disengage the serrations. With the serrations disengaged, the position the roller assembly 72 along the second arm 76 can easily be adjusted during installation or later readjustment.

REFERENCE NUMBER LIST

10 pocket door
12 pocket slot
14 wall component
16 wall component
18 vertical half studs
20 bottom plate of a wall component
22 pocket door guide
23 seating base
24 floor
26 first arm
28 second arm
30 apex where first and second arm join
32 roller assembly
34 roller
36 distal end of first arm
38 roller base
40 axle support
42 axle
44 fasteners, e.g. set screws
46 dovetail ridge
48 dovetail slot
50 holes through the second arm
52 alternative roller assembly
54 dovetail slot of alternative
56 roller arm of alternative
57 axle of alternative
58 roller of alternative
59 roller axle of alternative
60 roller base of alternative
61 boss fixed to roller arm
62 torsion spring
63 ear fixed to roller base
64 torsion spring leg attached to roller arm
66 torsion spring leg attached to roller base
70 seating base
72 roller assembly
74 first arm
76 second arm
78 latch lever
80 resilient hinge
81 dovetail slot
82 serrated surface of latch lever
84 serrated surface of second arm
86 apex
88 free end of second arm
90 latch lever gap
92 finger tab This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or the scope of the following claims.

The invention claimed is:

1. A pocket door guide for guiding a pocket door that is slidable in and out of a pocket slot formed with a wall, the pocket door guide comprising:

(a) a first arm for extending into a pocket slot and seating against an inner side of a wall component that defines a side of the pocket slot;

(b) a second arm connected to and extending transversely from the first arm for seating against an end of the wall component at the end of the pocket slot, the arms connected together at an end of each arm to form an apex so the second arm can extend from the apex transversely away from the pocket slot; and (c) a roller assembly having a rotatable roller and mounted to the second arm, the roller protruding, or adjustable to protrude, beyond the apex, the roller assembly including a roller base, axle supports mounted at opposite ends of the roller, and an axle extending from the axle supports into the roller at the central axis of the roller, the roller assembly being adjustably slidable along the second arm and has a position retainer engaging the roller base and engageable with the second arm for fixing the roller assembly at a selected position along the second arm.

2. A pocket door guide according to claim 1 wherein the first arm is tapered in thickness from a thicker part at the apex to the thinnest part at its opposite distal end to form a wedge configuration for guiding the door, when being closed, toward the center of the pocket slot until the door contacts the roller.

3. A pocket door guide according to claim 1 wherein:

(a) the second arm and the roller base are formed with a dovetail ridge on one and a mating dovetail slot on the other so the roller assembly can slide adjustably along the second arm without being separated from the second arm; and (b) the position retainer comprises fasteners that are mounted to the roller base and are engageable with the second arm to prevent sliding of the roller base with respect to the second arm for securing the roller base at a selected adjustment position.

4. A pocket door guide according to claim 3 wherein the fasteners are threadedly engaged to the roller base as set screws and are engageable against the second arm by being rotated.

5. A pocket door guide according to claim 3 wherein the second arm has holes for receiving screws through the second arm and into the end of the wall component, the holes being counter sunk holes so the roller base can slide freely over the top of the screws and not interfere with adjustment of the roller assembly.

6. A pocket door guide according to claim 5 wherein the first arm and the second arm extend linearly and are perpendicular to each other.

7. A pocket door guide according to claim 1 wherein (a) the roller base is adjustably slidable along the second arm closer and farther from the pocket slot; and (b) the roller base has at least one elongated slot longitudinally aligned transversely to the axle of the roller and the position retainer comprises fasteners extending through at least one elongated slot and engageable with the second arm to and configured to prevent sliding of the roller base with respect to the second arm upon rotation of the screws and for securing the roller base to the second arm at a selected adjustment position.

8. A pocket door guide according to claim 1 wherein the roller is movably mounted to the roller base for reciprocal motion toward and away from the door and is resiliently biased by a spring in a direction for increasing protrusion of the roller beyond the apex.

9. A pocket door guide according to claim 8 wherein the roller assembly further comprises: a roller arm having the roller rotatably mounted at one end of the roller arm and having the opposite end of the roller arm pivotally mounted to the roller base, the roller arm being biased by the spring for pivoting the roller arm in said direction for increasing protrusion of the roller beyond the apex.

10. A pocket door guide according to claim 9 wherein the spring is a torsion spring having opposite torsion spring legs, one spring leg connected to the roller arm and the other spring leg connected to the roller base.

11. A pocket door guide according to claim 1 wherein the position retainer has a latch lever that is attached by a resilient hinge to the roller assembly and has a serrated surface facing the second arm and the second arm has a mating serrated surface that is engageable with the serrated surface of the latch lever, the serrated surfaces being configured with opposing surfaces that are oriented to prevent translation of the roller assembly along the second arm in a direction away from the apex and toward an opposite end of the second arm, the latch lever being sufficiently spaced from the roller assembly to permit the latch lever to be lifted away from the second arm to disengage the serrated surface of the latch lever from the serrated surface of the second arm.

12. A pocket door guide according to claim 11 wherein the latch lever is integrally formed with the roller assembly.

13. A pocket door guide according to claim 12 wherein a finger tab protrudes from a free end of the latch lever beyond an end of the roller assembly to facilitate lifting of the latch lever away from the second arm.

14. A resiliently biased pocket door guide for guiding a pocket door that is slidable in and out of a pocket slot formed within a wall and also guiding the door along an extension of the pocket slot, the pocket door guide comprising:

(a) a seating base for seating against an end of a wall component at an end of the pocket slot; and (b) a roller assembly having a rotatable roller and mounted to the seating base, the roller protruding, or adjustable to protrude, into the extension of the pocket slot, the roller being movably mounted for reciprocal motion in a direction increasing or decreasing the protrusion of the roller into the extension of the pocket slot, and the roller being resiliently biased by a spring in a direction increasing the protrusion of the roller into the extension of the pocket slot, wherein the roller assembly is adjustably slidable along the seating base and has fasteners engaging the seating base for fixing the roller assembly at a selected position along the seating base.

15. A resiliently biased pocket door guide according to claim 14 wherein the roller assembly further comprises a roller base and a roller arm, the roller arm having the roller rotatably mounted at one end of the roller arm and having the opposite end of the roller arm pivotally mounted to the roller base, the roller arm being biased by the spring for pivoting the roller arm in said direction increasing the protrusion of the roller into the extension of the pocket slot.

16. A resiliently biased pocket door guide according to claim 15 wherein the spring is a torsion spring having opposite torsion spring legs, one spring leg connected to the roller arm and the other spring leg connected to the roller base.

* * * * *